US008347225B2

(12) United States Patent
Blinnikka et al.

(10) Patent No.: US 8,347,225 B2
(45) Date of Patent: Jan. 1, 2013

(54) SYSTEM AND METHOD FOR SELECTIVELY DISPLAYING WEB PAGE ELEMENTS

(75) Inventors: Tomi Blinnikka, San Pablo, CA (US); Steven Horowitz, Oakland, CA (US)

(73) Assignee: Yahoo! Inc., Sunnyvale, CA (US)

( * ) Notice: Subject to any disclaimer, the term of this patent is extended or adjusted under 35 U.S.C. 154(b) by 880 days.

(21) Appl. No.: 11/861,482

(22) Filed: Sep. 26, 2007

(65) Prior Publication Data

US 2009/0083661 A1      Mar. 26, 2009

(51) Int. Cl.
*G06F 3/14* (2006.01)
*G06F 3/17* (2006.01)
(52) U.S. Cl. ........ 715/787; 715/200; 715/234; 715/249; 715/745; 715/760; 715/854; 709/246
(58) Field of Classification Search .......... 715/205–208, 715/760; 370/401
See application file for complete search history.

(56) References Cited

U.S. PATENT DOCUMENTS

| | | | | |
|---|---|---|---|---|
| 6,920,617 B2* | 7/2005 | Nitta | | 715/745 |
| 6,931,598 B2* | 8/2005 | Price et al. | | 715/760 |
| 7,065,707 B2* | 6/2006 | Chen et al. | | 715/234 |
| 7,210,095 B1* | 4/2007 | Mor | | 715/234 |
| 7,302,634 B2* | 11/2007 | Lucovsky et al. | | 715/200 |
| 7,418,652 B2* | 8/2008 | Ornstein et al. | | 715/200 |
| 7,467,231 B2* | 12/2008 | Kegoya et al. | | 709/246 |
| 7,647,564 B2* | 1/2010 | Olander et al. | | 715/854 |
| 7,765,472 B2* | 7/2010 | Fablet | | 715/249 |
| 2008/0225870 A1* | 9/2008 | Sundstrom | | 370/401 |

* cited by examiner

*Primary Examiner* — Ruay Ho
(74) *Attorney, Agent, or Firm* — James J. DeCarlo; Greenberg Traurig, LLP

(57) ABSTRACT

Systems and methods are disclosed for selectively displaying content corresponding to web page elements. A web page element can comprise one or more DIV tags that may be used to encapsulate and identify other elements and information. The first name and the first address of the element are stored. In a receiving operation, a display request to visibly display the element, is received. A received display request identifies the first name or the first address, or both, of the element. In response to receiving the display request, content associated with the first address, and at least a portion of the content comprising the identified element are retrieved. The content to obtain the identified element is parsed, and the identified element is subsequently displayed.

24 Claims, 5 Drawing Sheets

SYSTEM AND METHOD FOR SELECTIVELY DISPLAYING WEB PAGE ELEMENTS

COPYRIGHT NOTICE

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

BACKGROUND

As the Internet grows in both complexity and popularity, the need for effective systems, interfaces and methods for interacting with the Internet have increased. As a result of the Internet's growth, many Internet users are confronted with websites that permit access to hundreds, if not thousands, of web pages, files, documents and other types of information. In many cases, Internet content may be so voluminous that it cannot fit on a single display device. Thus, it is becoming increasingly difficult for Internet users to interact with and display information from the Internet.

In response to this difficulty, many Internet applications and interfaces now incorporate one or more scroll bars or sliders whereby Internet users may manipulate an input device and move through the body of text or other Internet content. Some Internet applications and interfaces may also provide navigational controls (e.g., "page up" or "page down" references) that may permit Internet users to navigate to different portions of a single or related set of web pages. Other Internet applications and interfaces may employ other types of controls, including but not limited to supplying links to popular Internet content (e.g., "Table of Contents," "Products," "Shopping Cart," or "Store Locator" web pages) or sections of a web page, to help Internet users navigate Internet content.

Despite these and similar measures to improve user interaction with the Internet, Internet users regularly navigate away from the web pages or portions of web pages that contain navigational controls. Internet users who navigate away from navigational controls may waste valuable time returning to the navigational controls or forget that such controls are available. In many cases, Internet users that are confronted with a vast amount of web page content may be required to use a navigational control that dynamically changes its properties (e.g., appearance and scroll speed) in response to the amount of web page content. In these cases, Internet users may not recognize the changed properties, or they may find that changing properties frustrate them In yet other cases, navigational controls may only permit navigation to web pages or portions of web page that are of no interest to the Internet user. In still other cases, Internet applications and interfaces designed to surmount these problems make it increasingly difficult for advertisers and other business persons to present a persistent ad presence to Internet users who may, for example, use a navigational control that inadvertently leads the Internet user away from advertising content.

SUMMARY

Against this backdrop systems and methods have been developed for displaying content. More specifically, systems and methods have been developed for selectively displaying content corresponding to elements associated with a name.

In one embodiment (which embodiment is intended to be illustrative and not restrictive), a method is provided. The method includes identifying an element of content to be visibly displayed, the element having a first name and a first address. The method further includes storing the first name and the first address. The method yet further includes receiving a display request to visibly display the identified element. The method still further includes, in response to receiving the display request, retrieving content associated with the first address, at least a portion of the content comprising the identified element. The method further includes parsing the content to obtain the identified element.

In one aspect, the method further comprises displaying the identified element. In another aspect of the method, the step of displaying the identified element is performed by a browser program. In yet another aspect of the method the step of displaying the identified element is performed by a client program. In still another aspect of the method, the step of displaying the identified element occurs in accordance with stored user preferences. In another aspect of the method, the step of displaying the identified element occurs within a defined display region. In yet another aspect of the method, the defined display region is a borderless window. In still another aspect, the method further includes adjusting at least one property of the display region. In another aspect of the method, the at least one property adjusts a dimension of the display region. In yet another aspect of the method, the at least one property adjusts the display region's opacity.

In one aspect of the method, the steps of identifying an element of content to be visibly displayed, the element having a first name and a first address; storing the first name and the first address; receiving a display request to visibly display the identified element; retrieving content associated with the first address in response to receiving the display request, at least a portion of the content comprising the identified element; and parsing the content to obtain the identified element are performed at a client. In another aspect of the method, the steps of identifying an element of content to be visibly displayed, the element having a first name and a first address; storing the first name and the first address; receiving a display request to visibly display the identified element; retrieving content associated with the first address in response to receiving the display request, at least a portion of the content comprising the identified element; and parsing the content to obtain the identified element are performed at a server.

In another aspect of the method, the step of identifying an element of content to be visibly displayed occurs prior to performing the step of retrieving, in response to receiving the display request, content associated with the first address, at least a portion of the content comprising the identified element. In yet another aspect of the method, the step of identifying an element of content to be visibly displayed occurs while performing the step of retrieving content associated with the first address in response to receiving the display request, at least a portion of the content comprising the identified element. In still another aspect of the method, either or both of the first name and the first address are stored on a server. In another aspect of the method, the display request identifies either or both of the first name or the first address. In yet another aspect of the method, the first address is a URI. In still another aspect of the method, the content associated with the URI takes the form of a web page. In another aspect, the method includes associating a second address with the element as an alternate for the first address. In yet another aspect of the method, the display request utilizes either the first address or the second address. In another aspect, the method includes receiving input from a user representing a selection of at least a portion of the content, and identifying the element based upon the selection. In yet another aspect of the method, one instance of the first name associated with the element is stored on a client computing device. In still another aspect of the method, a second instance of the first name and the first address associated with the element are stored on a server computing device.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

Figure 1:
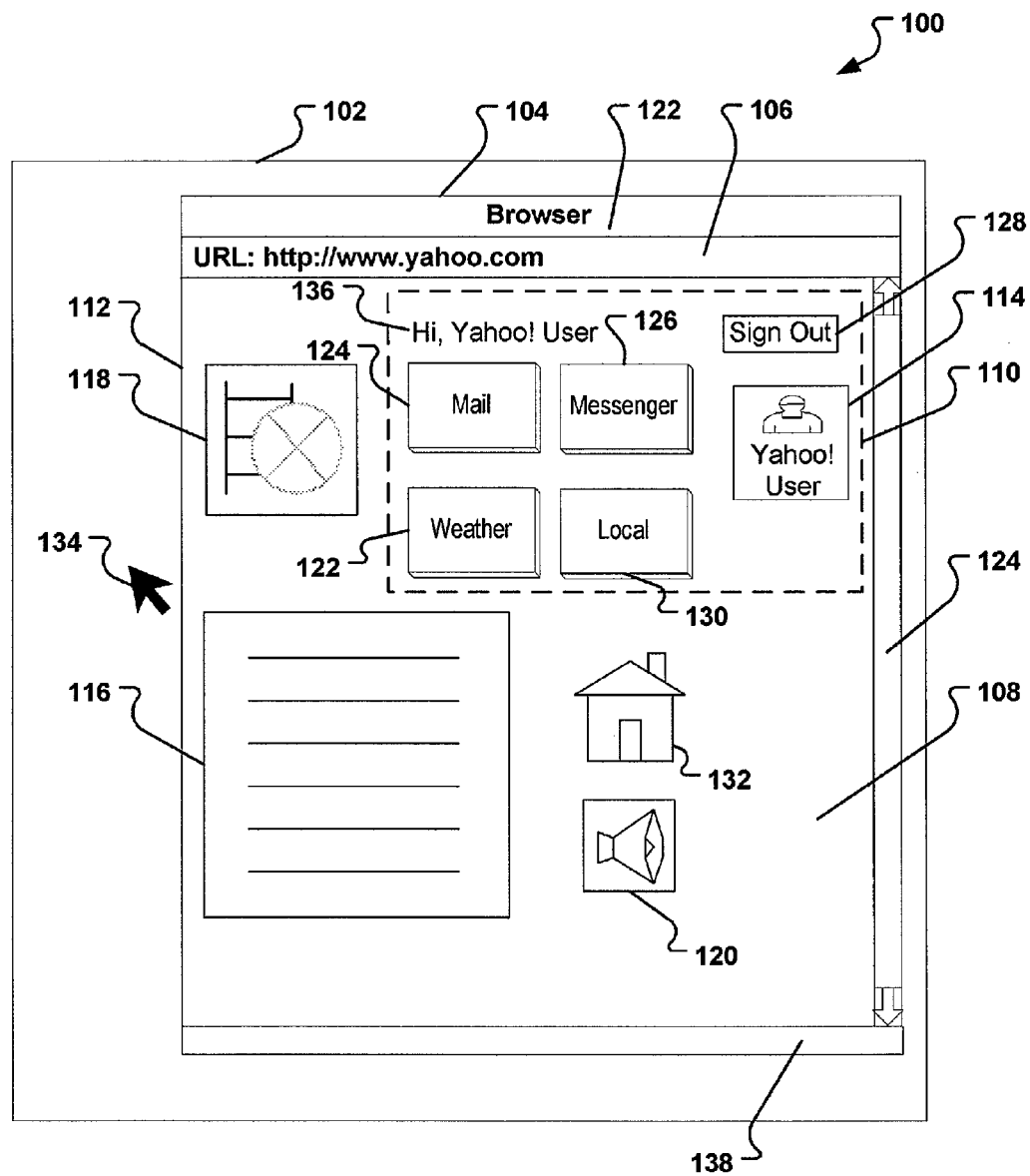
FIG. 1 illustrates an embodiment of a graphical user interface for selectively displaying content.

FIG. 1 illustrates an embodiment of a graphical user interface (GUI) 100 for selectively displaying content. In one embodiment, a GUI 100 is comprised of one or more desktop 102 display environments. A desktop 102 may be comprised of many graphical user interfaces, including but not limited to icons, buttons, windows, toolbars, folders, wallpaper, images, text, and a cursor 134. A desktop 102 may also be comprised of a window manager, file manager, as well as various themes, programs and libraries for managing the desktop. One skilled in the art will recognize that a desktop 102 may take many forms, including but not limited to the desktop display environments associated with the Microsoft Windows (e.g., Windows XP and Windows Vista) and Mac OS X operating systems.

As set forth in the embodiment shown, a GUI 100 may also include a browser program 104. In one embodiment, a browser program 104 is a software application (e.g., Microsoft Internet Explorer, Mozilla Firefox, Opera, Netscape Explorer or Apple Safari) that enables a user to access, render and interact with text, images, and other information typically located on a web page at a website on the Internet or a local area network. In one embodiment, a browser program 104 is comprised of instructions and data residing on computing device. In another embodiment, browser program 104 may be comprised of one or more instructions and/or data that may reside on multiple computing devices that may be networked. In one embodiment, a browser program 104 is operable to transmit information to and/or from other programs and/or computing devices. In one embodiment, a browser program 104 may include various elements and controls including but not limited to a scroll bar 124, a title bar 122, a status bar 138, and an address field 106. One skilled in the art will recognize that browser program 104 may take many forms, comprise various other functionality, and may rely upon one or more other programs that may reside at local (i.e., client) and/or remote (i.e., server) computing device locations.

In one embodiment, a browser program 104 may communicate with computing devices (e.g., computing devices including communications modules) using various application layer network protocols, including but not limited to the hypertext transfer protocol ("HTTP") and the file transfer protocol ("FTP"). One skilled in the art will recognize that a browser program 104 may utilize many other type of network protocols, including but not limited to the transmission control protocol ("TCP") and Internet Protocol ("IP"). HTTP is commonly used by a browser program 104 as a communications protocol to access network resources such as Uniform Resource Identifiers ("URI"). URIs may be comprised of a compact string of characters used to identify or name a resource and typically enable interaction with representations of the resource over a network, typically the Internet. A URI may be classified as a locator or a name or both. A Uniform Resource Locator ("URL") is a URI that, in addition to identifying a resource, typically describing its primary access mechanism (e.g., using the schema "ftp://" a URL may indicate a network resource accessible by the FTP network protocol) or network location. Similarly, a Uniform Resource Name (URN) is a URI that identifies a resource by name in a particular namespace (i.e., a collection of names or identifiers where the names or identifiers of the collection are unique). The combination of HTTP and URI protocols commonly permit a browser program 104 to access, render, and interact with a web page.

As used in this disclosure, as well as the appended figures and claims, a web page is comprised of information that may be rendered for display 108 in a browser window 112 of a browser program 104. Information that is rendered for display in a browser window 112 may include, but is not limited to, text, images, animations, video, sound, streaming media, and other types of content and/or data. Information that is rendered for display in a browser window 112 may also include information that does not change (i.e., static information) and/or information that changes (i.e., dynamic information). Static information and dynamic information may include computer-executable instructions for instructing a browser program 104 how to render the information, as a web page 108, in a browser window 112. For example, using PHP: Hypertext Preprocessor ("PHP") or Asynchronous JavaScript and XML ("Ajax"), a server may provide dynamic information that instructs a browser program 104 how to display a web page 108 in response to changing user inputs. One skilled in the art will recognize that a web page may take many forms, and may rely upon one or more other programs that may reside at local (i.e., client) and/or remote (i.e., server) locations.

In one embodiment, a web page 108 may be comprised of information that conforms to one or more markup languages. Markup languages typically provide a set of codes that are embedded within the information received by a browser program 104 and that instruct a browser program 104 how to display the information as a web page 108. Hyper-text markup language ("HTML") is the markup language typically used for displaying a web page 108. HTML is typically identified in the HTTP protocol using the Multipurpose Internet Mail Extensions ("MIME") content type. In addition to HTML, a web page 108 may also include other markup languages, such as the Extensible Markup Language ("XML") or the Extensible Hypertext Markup Language ("XHTML").

In one embodiment, the information used for displaying a web page 108, including but not limited to embedded markup language information, may comprise one or more elements (i.e., web page elements). For example, where HTML is used for rendering a web page 108, a web page element may be comprised of one or more tags, the content or data contained between the tags, and tag attributes. In one embodiment, a tag may be a markup language code that identifies an element in a document (e.g., a heading or a paragraph) for the purpose of formatting, indexing, and/or linking information in the document. In another embodiment, a tag may be comprised of two pairs of angled brackets that are placed before and after certain information (e.g., in HTML, the pair of <I> and </I> tags indicates that information contained within the tags should be italicized).

In one embodiment, elements may be encapsulated (i.e., to treat a collection of information that may include multiple elements as a single element) or nested. For example, an element may be comprised of one or more <DIV> tags that may be used to encapsulate and identify other elements and information. Further to this example, a set of elements (e.g., web page elements such as buttons, images, and text), including but not limited to the underlying (but not displayed) markup language codes associated with the elements, may be grouped together using a collective element (e.g., a <DIV> tag). In this embodiment, an element may identify a collection of displayed and/or undisplayed elements associated with a display region element 110 (e.g., a bounded two-dimensional area of a web page 108). For example, a user may use a cursor 134 to select a display region element 110 (e.g., a <DIV> element) that may identify a collection of other web page elements (e.g., web page elements 114, 122, 124, 126, 128, 130, 136) on a web page 108. One skilled in the art will recognize that the collection may be identified by a name, an address, or other information. As another example, a user may select one or more web page elements (e.g., web page elements 114, 122, 124, 126, 128, 130, 136) that may be identified as a collection by another web page element (e.g., a <DIV> element). One skilled in the art will recognize that collections of elements may be identified, defined, and grouped in other ways that are also within the scope of this disclosure. One skilled in the art will also recognize that web page elements may be associated with other information, including computer-executable instructions (e.g., a web page element comprising an interactive image may change its display dimensions upon selection by a user). One skilled in the art will further recognize that web page elements may or may not be visible on a web page 108. One skilled in the art will also recognize that elements may be identified by various computing devices, including but not limited to computing devices connected or distributed via a network.

As set forth in the embodiment shown, a web page 108 may include many types of web page elements, including but not limited to, a textual web page element 116, 136, an audio web page element 120, a media web page element 118, an image web page element 114, 132, and web page button elements 124, 126, 122, 128. One skilled in the art will recognize that web page 108, as set forth in the embodiment shown, may be further comprised of web page elements that are not displayed in a rendered web page 108. For example, a rendered web page 108 may also include markup language information that describes metadata (e.g., search terms) associated with the web page 108. As another example, a rendered web page 108 may also include web page elements that control the font and display characteristics of textual web page elements 116, 136.

Figure 2:
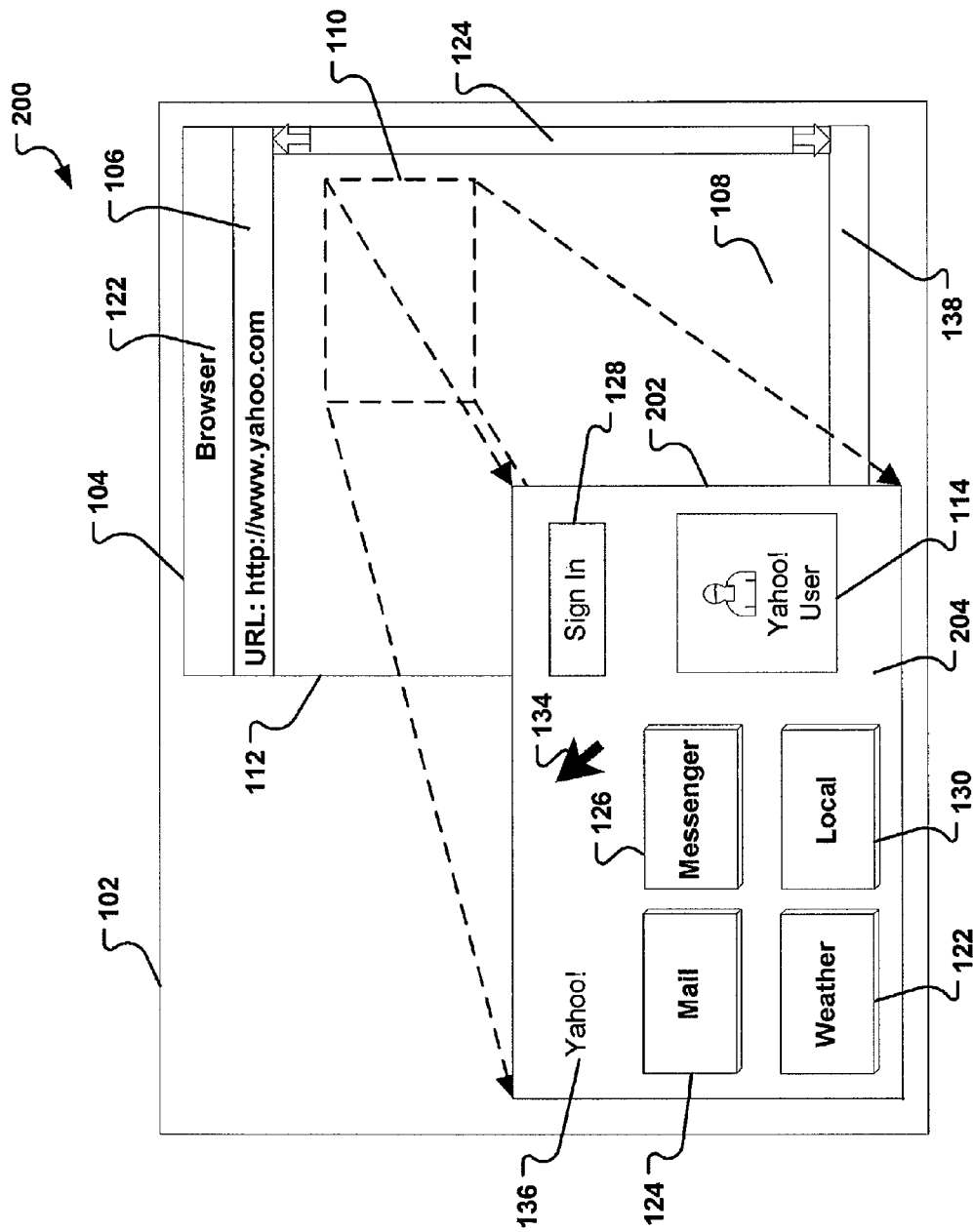
FIG. 2 illustrates an embodiment of a graphical user interface for selectively displaying content.

FIG. 2 illustrates an embodiment of a GUI 200 for selectively displaying content. In one embodiment, a GUI 200 is comprised of a desktop 102 and a browser program 104. As described below, FIG. 2 further illustrates an embodiment of a GUI associated with an embodiment of a method for selectively displaying content. As set forth in the embodiment shown, a first web page 108 is displayed in a first browser window 112 of browser program 104. In one embodiment, in response to receiving a selection request from a cursor 134, a first element (e.g., display region element 110) is identified and/or selected for display in an application window 202. In one embodiment, a second web page 204, including only display region element 110, is displayed in the application window 202. In the embodiment shown, the display region element 110 that is identified and/or selected for display in an application window 202 may identify a collection of several elements (e.g., web page elements 114, 122, 124, 126, 128, 130, 136).

Figure 3A:
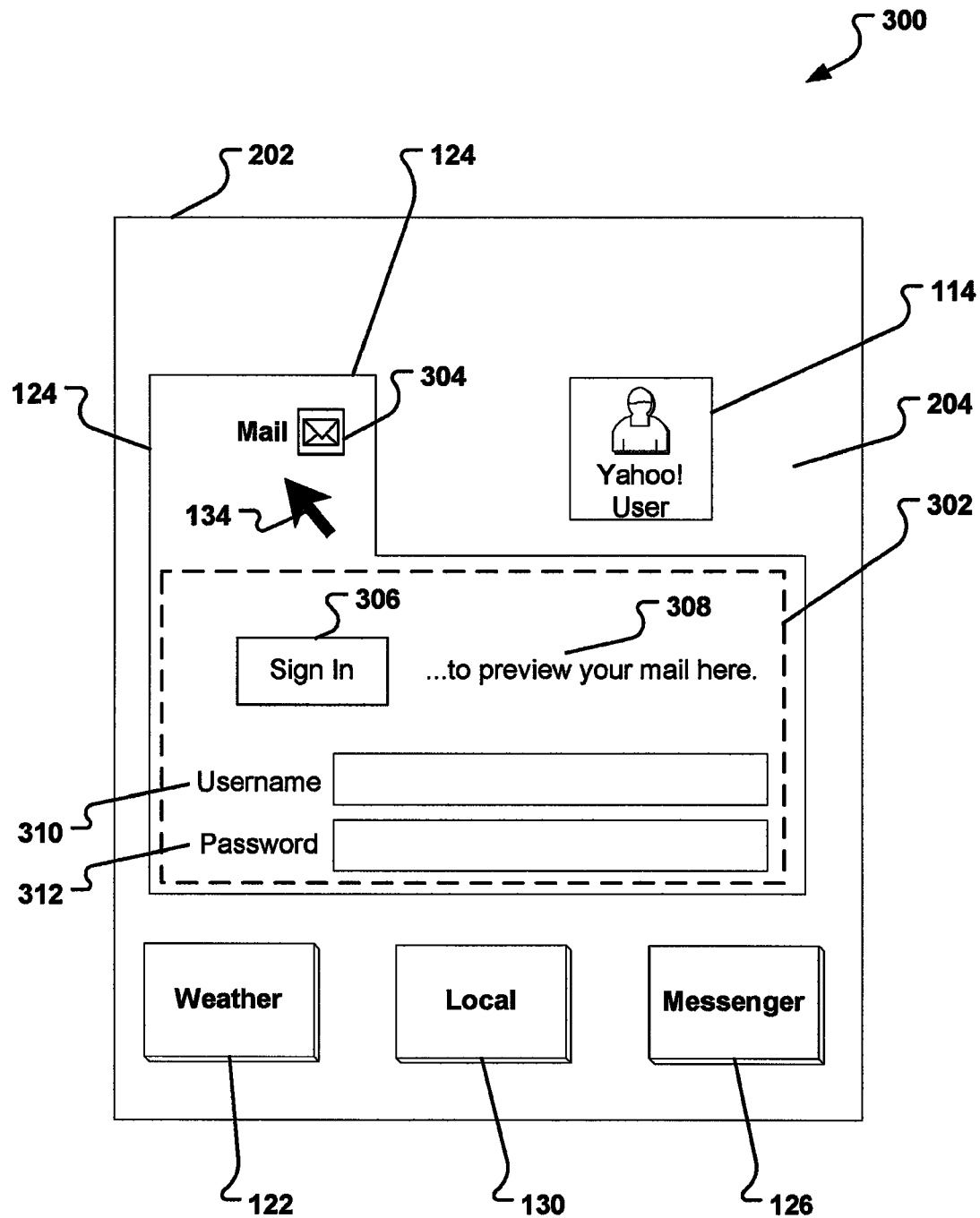
FIG. 3a illustrates an embodiment of a graphical user interface for selectively displaying content.
Figure 3B:
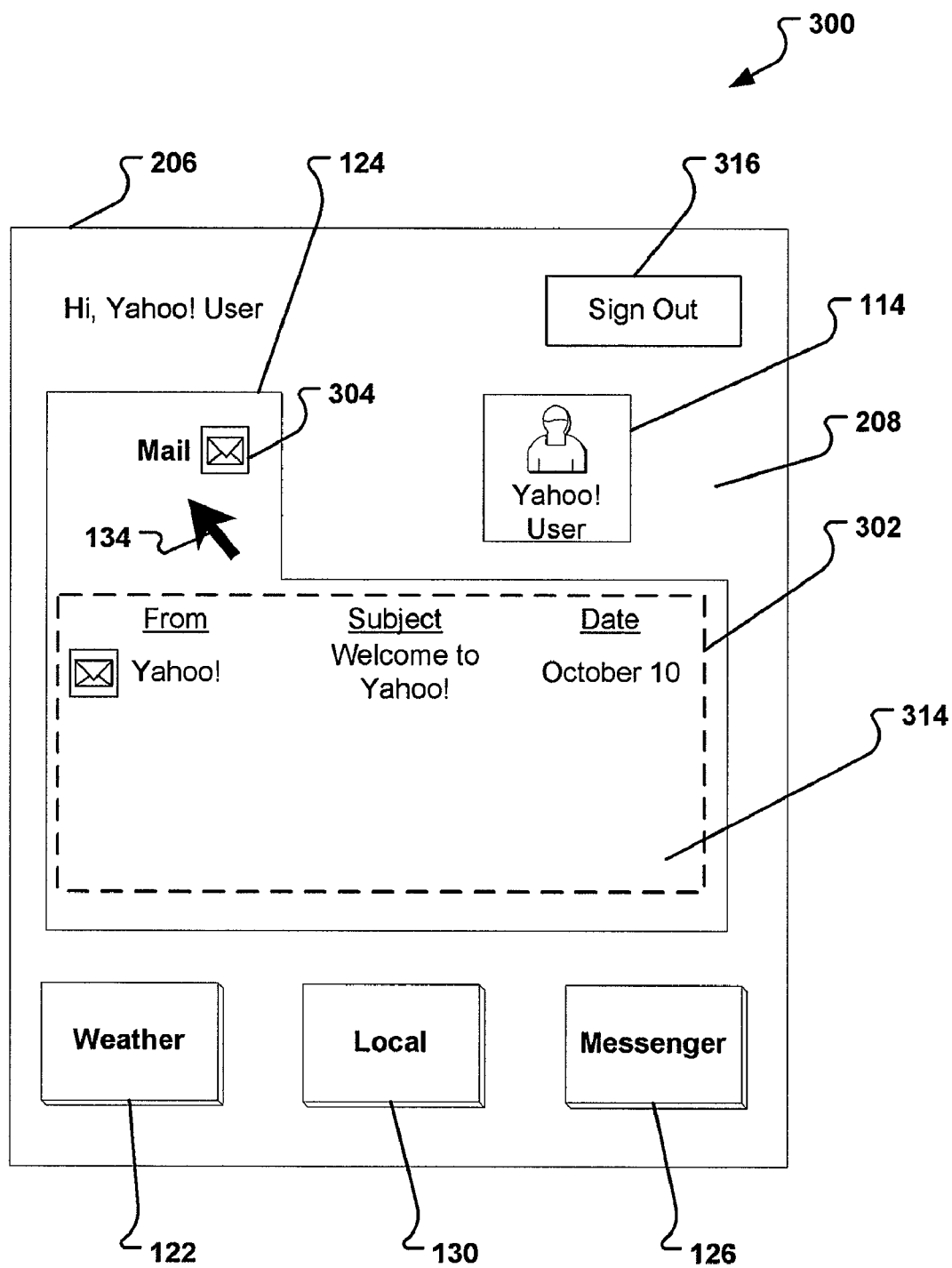
FIG. 3b illustrates an embodiment of a graphical user interface for selectively displaying content.

FIG. 3a and 3b illustrate embodiments of a GUI 300 for selectively displaying content. In the embodiment illustrated in FIG. 3a, a GUI 300 is comprised of an application window 202. As set forth in the embodiment shown, a second web page 204 includes only the display region 110 for display in a borderless application window 202. Notably, the second web page 204 includes a second display region element 302 (e.g., a nested <DIV> element that encapsulates other elements) and web page element 304 (i.e., mail icon) in response to the placement of a cursor 134 over the "Mail" web page element 124. Further to the embodiment illustrated in FIG. 3a, the second display region element 302 may include various other elements, such as a "Sign In" command button element 306, a text element 308, and "Username" and "Password" text field elements 310, 312.

As further illustrated in FIG. 3b, the elements within a second display region element 302 may change. For example, in response to entering username and password information in text field elements 310, 312 and selecting the "Sign In" command button element 306, the second display region element 302 may correspond to an encapsulated mail account element 314 (e.g., a <DIV> named "Mail") that itself corresponds to a user's mail account. Further to this example, a mail account element 314 may be associated with an address such as a URL corresponding to the user's mail account. Additionally, elements may change in response to changes in other elements. For example, changes to a "child" element (e.g., signing in to a user mail account using elements within the display region element 302) may result in changes to a "parent" element (e.g., adding a "Sign Out" command button element 316 to web page element 206).

Figure 4:
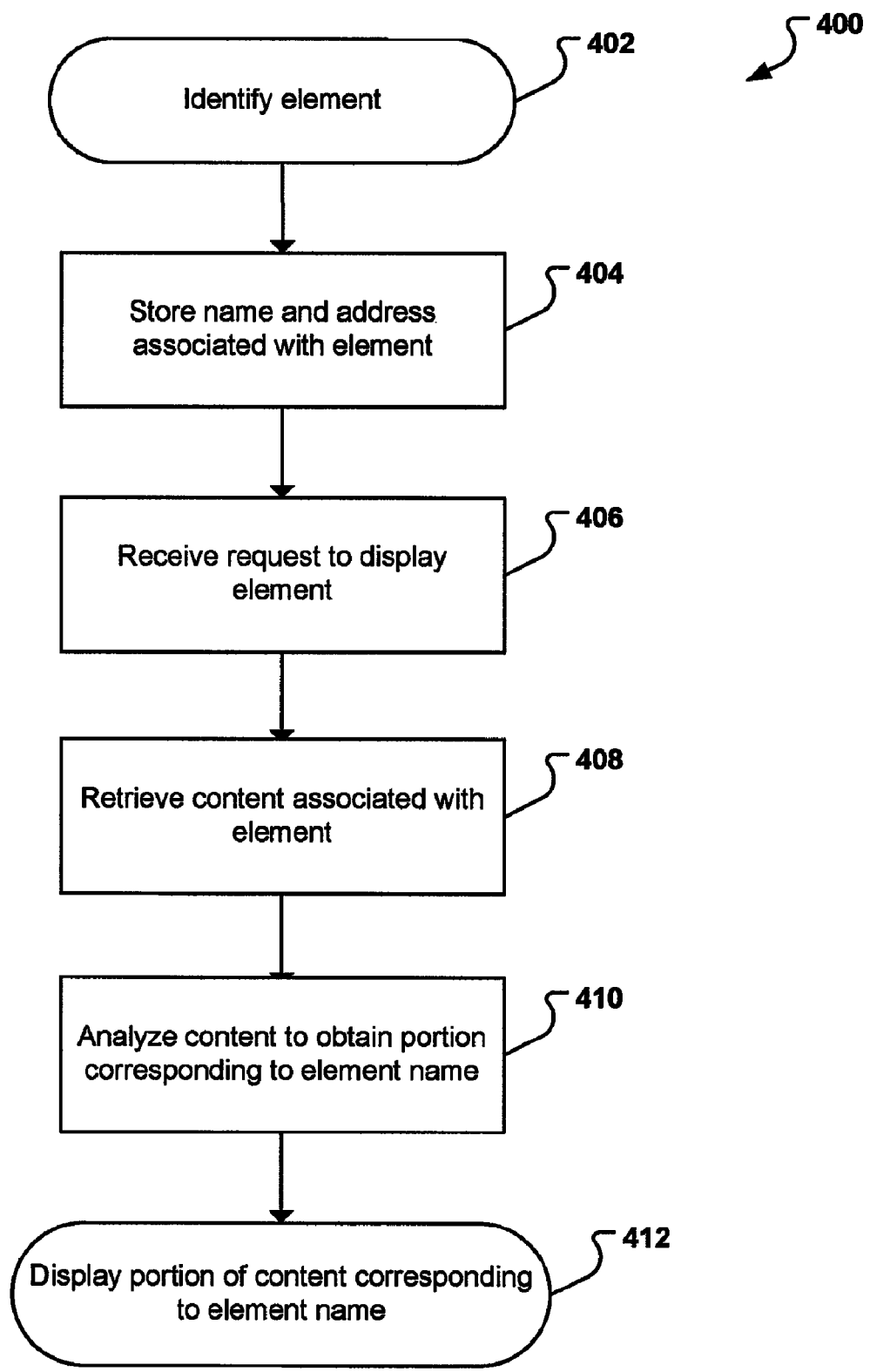
FIG. 4 illustrates an embodiment of a method for selectively displaying content.

FIG. 4 illustrates an embodiment of a method 400 for displaying content. In one aspect of the method 400, an element, e.g., a DIV element, includes a name and an address. For example, a markup language file (i.e., an HTML) may reside on a server such that a browser program reading and interpreting the markup language file may identify a DIV element and its name and address. The address associated with the element may be an address such as a URI, as discussed previously. In one embodiment of the method 400, more than one address may be associated with an element. For example, where an element (i.e., the root or parent element) that encapsulates a logical collection of other elements is stored on a server, the element may be associated with a first address (e.g., a URL of a first web page) and a second address (e.g., a URL of a second web page), such that the first address and the second address correspond to different content of collected elements that together may accessed to comprise the root or parent element. Similarly, a second address may replace the first address associated with an element. For example, where content at a first address expires or otherwise becomes inaccessible, a second address may be used to replace or substitute for the first address. Following this example, a first address may redirect display requests to a second address or the element may be associated only with a second address going forward (i.e., as a replacement address). In one aspect, a second address may be stored at a server. Alternatively, a second address may be stored at a client device. In yet another aspect, a second address may be transmitted (e.g., in an address replacement operation) from a client computing device to a server.

In the method 400, an element of content to be visibly displayed, where the element has a first name and a first address, is identified in an identifying operation 402. In one aspect, the first name of the element may identify at least one of a logical collection of elements. In another aspect, either or both of the first name and the first address of the element may be stored on a server. In one aspect, the first address of the element may be a URI. For example, the URI may be associated with content that takes the form of a web page (e.g., content at a URL). For example, an element may identify content at an address (i.e., URL) in the form of a web page that includes many other elements in addition to the element associated with a name and the address. Following this example, the step of identifying the element may comprise reading the web page markup language to identify the part of the web page and/or the content that corresponds to the element's name. As yet another example, an element's name may correspond to the entire web page associated with the address of the element. In another aspect of the method 400, one instance of a first name associated with the element may be stored at a client computing device and another instance of the first name may be stored at a server. In this manner, access to the content associated with the element's address may be obtained irrespective of whether a display request originates from the client computing device or the server computing device. In another aspect, one instance of either or both of the first name and the first address of the element may be stored on a client. In yet another aspect, a second instance of either or both of the first name and the first address of the element may be stored on a server.

In a storing operation 404 of the method 400, the first name and the first address of the element is stored. For example, a unique name or identifier (e.g., a number) may be stored that references or represents the element. The element's first name and first address may be stored on a client or a server, or a combination thereof In a receiving operation 406, a display request to visibly display the element, is received. In one aspect of a receiving operation 406, the display request identifies the first name or the first address, or both, of the element. For example, where the display request is transmitted from a client computing device to a server computing device, the display request may include the name associated with the element, the address associated with the element, or both. Where an element has two or more addresses associated with the element, the display request may identify the two or more addresses or an address other than the first address of the element. In one embodiment, the method 400 may further comprise receiving input from a user representing a selection of at least a portion (i.e., any part, up to and including the whole) of the content and identifying the element based upon the selection. By way of example, a display request may include selection of an element or an area of a web page using an input device (e.g., a mouse or keyboard), selecting a web page element within a display region that encapsulates other web page elements (e.g., a web page element such as a banner or image may declare itself to be the "selectable" display region of a first web page), or selecting a web page element referencing a certain selectable display region. In another embodiment, the display of another web page in a browser window may itself form display request (e.g., a display event) that triggers the retrieval of the content associated with an element for display in a browser window. Similarly, in another aspect of the method 400, a notification may be received (e.g., a notifying event) that another web page element has changed. This notification may result in a display request that requests updating the web page with the content associated with the element.

In response to receiving the display request, content associated with the first address is retrieved in a retrieving operation 408. At least a portion of the content retrieved in retrieving operation 408 comprises the identified element. For example, in the case of retrieving a web page, including but not limited to its underlying markup language instructions, more content than is associated with the element's name may be retrieved in retrieving operation 408. Thus, where a DIV element is set forth within a web page, retrieving operation 408 may retrieve the content associated with the DIV element as well as other content.

In an analyzing operation 410, the content is then analyzed to obtain the identified element. In one embodiment of analyzing operation 410, analyzing the content comprises parsing or breaking the content into smaller chunks, whereby a program (e.g., a browser program) can act upon the content and obtain the content corresponding to the first name, the first address, or both, of the element. For example, a browser program 104 may parse one or more web page elements of a web page to identify a first element for display. In another embodiment of analyzing operation 410, analyzing the content comprises interacting with a document object model ("DOM") or intermediate script to obtain the identified element. For example, a browser may interpret the content to create a DOM. An application programming interface ("API") for the DOM may then be utilized to request the identity (e.g., the name) of the element. Further to this example, the identified element (e.g., the name of the element) may be returned for display. Display of the identified element may then further utilize the API, for example, by displaying the element corresponding to the name. The display of the identified element may further utilize the API so as to display the element beginning at its top-left corner (e.g., coordinates for the element that are returned via the API) and sizing the display to a certain height and width (e.g., the element's height and width). In one aspect of the method 400, the content may include computer-executable instructions and the step of analyzing 410 may comprise processing the computer-executable instructions and identifying the portion of the content corresponding to the first name. In another aspect of the method 400, the first name of the element may itself identify a logical collection of elements. In this aspect, the step of analyzing 410 may comprise identifying at least one of the logical collection of elements. For example, each of a collection of elements may be identified by an alphanumeric value associated with each of the elements. Further to this example, the step of analyzing 410 may comprise identifying the alphanumeric value representing the collection of elements.

In a displaying operation 412 of the method 400, the identified element is displayed. In one aspect of displaying operation 412, a browser program displays the identified element. In another aspect of displaying operation 412, the identified element is displayed by a client program. In still another aspect of displaying operation 412, display of the identified element occurs in accordance with stored user preferences. In another aspect of displaying operation 412, display of the identified element occurs within a defined display region. The defined display region may be a borderless window. In another aspect, the method 400 further includes adjusting at least one property of the display region. Adjusting a display region property may include, but is not limited to, adjusting a dimension or the opacity (or both) of a display region. In one aspect, a browser program may display the portion of the content corresponding to the first name of the element. For example, a browser program may display the portion of content within a bordered or borderless window (i.e., displaying the portion of content in what is seemingly a separate application window). In another aspect, a client program may display the portion of the content corresponding to the first name. For example, a client program (e.g., a Java applet or a word processor) may itself render markup language information for display within some area. One skilled in the art will recognize that the client program may take many forms, including but not limited to client programs utilizing an application programming interface (API) that may interface with a browser program. In yet another aspect, where identified element identifies a logical collection of elements, the step of displaying may comprise displaying the logical collection of elements. As an example, where an element identifies an encapsulated collection of elements, display of the named element may comprise displaying all of the encapsulated elements. In yet another embodiment of displaying operation 412, display region properties may also include, but are not limited to, instructions or other information that may alter the appearance and/or other display properties or characteristics of the content. For example, display region properties may include instructions for launching and displaying content within a particular program (e.g., a client program), for instance a browser program). As another example, display region properties may include information specifying the size and/or position of the region (e.g., a display window) where content is displayed. In one aspect of the method 400, displaying the identified element may include applying the display region properties only to the content corresponding to the element's first name. Further this example, display properties specifying the size, position and layout of the content associated with an element's name may be applied to the content. In one embodiment, display preferences may be received from a user of a client computing device. For example, a user of a client computing device may save personalized display properties that may be applied to displayed content in a user-customized manner. As another example, a content provider (e.g., a server computing device) may transmit predetermined display properties to a client computing device. One skilled in the art will further recognize that display region properties may include but are not limited to information that describes or commands adjusting the height, width, or location of a browser window (e.g., in response to updating a web page).

In another embodiment of the method 400, identifying operation 402, storing operation 404, receiving operation 406, retrieving operation 408, and parsing operation 410 may be performed at a client, a server or some combination or permutation thereof One skilled in the art will recognize that certain operations (as identified above) may precede certain other steps. By way of example, and not of limitation, identifying operation 402 may occur prior to or during the performance of retrieving operation 408.

In yet another embodiment of method 400, a second amount of content corresponding to a second element may be identified. For example, in response to receiving a second amount of content, one or more display region properties may be adjusted. For example, where the first amount of content comprises a sign-on screen, a display region may be resized to accommodate the second amount of content that may comprise user-account information (e.g., mail, personalized news, etc.). As another example, display of the second amount of content may result in changing the position of the display region within a display. Where the first amount of content comprises a sign-on screen centered within the display, the second amount of content may comprise a news ticker that is displayed in a lower portion of the display. In one aspect of the method 400, user interactions with the first amount of content may influence the display of the second amount of content.

In other embodiments, one or more of the above referenced methods may comprise a computer readable medium encoding or containing computer executable instructions for performing a method for displaying a web page element. By way of example, and not limitation, a computer readable medium may comprise computer storage media (i.e., storage modules) and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present invention. For example, a web page displayed in a browser window may include other elements and content than web page elements and/or Internet content. As another example, a browser program may include computer-executable instructions for executing a separate program for identifying a selected or preselected web page element. In still yet another example, the browser program may comprise a subroutine of a larger process or program (e.g., as discussed above, the browser program may be part of a word processing program) or the browser program may share computer-executable instructions with other programs.

Numerous other changes may be made which will readily suggest themselves to those skilled in the art and which are encompassed in the spirit of the invention disclosed and as defined in the appended claims.

What is claimed is:

1. A method comprising:
   (a) identifying, via a computing device, an element of content to be visibly displayed, the element having a first name and a first address;
   (b) storing, via the computing device, the first name and the first address;
   (c) receiving, at the computing device, a display request to visibly display the identified element, the display request comprising information that identifies at least the first name or first address associated with the element;
   (d) in response to receiving the display request, retrieving, via the computing device, content associated with the first address, at least a portion of the content comprising the identified element; and
   (e) analyzing, via the computing device, the content to obtain the identified element, said analyzing comprising parsing said portion of the retrieved content to obtain the identified element via a document object model of the content and identify information that is updated based on the identified element, said updated information corresponding to the first name and first address of the identified element.

2. The method of claim 1 further comprising:
   (f) displaying the identified element in association with the updated information.

3. The method of claim 2 wherein step (f) is performed by a browser program.

4. The method of claim 2 wherein step (f) is performed by a client program.

5. The method of claim 2 wherein step (f) occurs in accordance with stored user preferences.

6. The method of claim 2 wherein step (f) occurs within a defined display region.

7. The method of claim 6 wherein step (f) occurs within a borderless window.

8. The method of claim 6 further comprising:
   (g) adjusting at least one property of the display region.

9. The method of claim 8 wherein the at least one property adjusts a dimension of the display region.

10. The method of claim 8 wherein the at least one property adjusts the display region's opacity.

11. The method of claim 1 wherein steps (a) through (e) are performed at a client.

12. The method of claim 11 wherein step (a) occurs prior to performing step (d).

13. The method of claim 11 wherein step (a) occurs while performing step (d).

14. The method of claim 11 wherein the first name identifies at least one of a logical collection of elements.

15. The method of claim 11 wherein either or both of the first name and the first address are stored on a server.

16. The method of claim 11 wherein the display request identifies either or both of the first name or the first address.

17. The method of claim 11 wherein the first address is a URI.

18. The method of claim 17 wherein the content associated with the URI takes the form of a web page.

19. The method of claim 11 further comprising:
   (f) receiving input from a user representing a selection of at least a portion of the content; and
   (g) identifying the element based upon the selection.

20. The method of claim 11 wherein one instance of either or both of the first name and the first address of the element are stored on a client.

21. The method of claim 20 wherein a second instance of either or both of the first name and the first address of the element are stored on a server.

22. The method of claim 1 wherein the analyzing of step (e) comprises:
   interacting with the document object model of the content to obtain the identified element.

23. A system comprising:
   a plurality of processors;
   (a) a identification module, implemented by at least one of said plurality of processors, that identifies an element of content to be visibly displayed, the element having a first name and a first address;
   (b) a storage module associated with a computer-readable storage medium that stores the first name and the first address;
   (c) a communications module, implemented by at least one of said plurality of processors, that receives a display request to visibly display the identified element, the display request comprises information that identifies at least the first name or first address associated with the element, and, in response to receiving the display request, retrieves content associated with the first address, at least a portion of the content comprising the identified element; and
   (d) at least one of said processors analyzes the content to obtain the identified element by parsing said portion of the retrieved content to obtain the identified element via a document object model of the content and identify information that is updated based on the identified element, said updated information corresponding to the first name and first address of the identified element.

24. A computer readable storage medium tangibly encoded with computer executable instructions, that when executed by a computer, perform a method comprising:
   (a) identifying an element of content to be visibly displayed, the element having a first name and a first address;
   (b) storing the first name and the first address;
   (c) receiving a display request to visibly display the identified element, the display request comprises information that identifies at least the first name or first address associated with the element;
   (d) in response to receiving the display request, retrieving content associated with the first address, at least a portion of the content comprising the identified element; and
   (e) analyzing the content to obtain the identified element by parsing said portion of the retrieved content to obtain the identified element via a document object model of the content and identify information that is updated based on the identified element, said updated information corresponding to the first name and first address of the identified element.

* * * * *